United States Patent
Grehant et al.

[11] Patent Number: 6,072,265
[45] Date of Patent: Jun. 6, 2000

[54] SUPPLY CIRCUIT FOR A TRAVELING-WAVE PIEZO-ELECTRIC MOTOR

[75] Inventors: Bernard Jean-Pierre Grehant, Nancy sur Cluses; Lionel Petit, Caluire; Bertrand Nogarede, Toulouse, all of France

[73] Assignee: Somfy, Cluses, France

[21] Appl. No.: 09/250,334

[22] Filed: Feb. 16, 1999

[30] Foreign Application Priority Data

Feb. 20, 1998 [FR] France .................................. 98 02070

[51] Int. Cl.[7] .................................................. H01L 41/04
[52] U.S. Cl. ......................................... 310/316.02; 318/116
[58] Field of Search .............................. 310/317, 316.01, 310/316.02; 318/116

[56] References Cited

U.S. PATENT DOCUMENTS

| | | | |
|---|---|---|---|
| 4,658,172 | 4/1987 | Kazuhiro . | |
| 4,772,814 | 9/1988 | Lewus | 310/72 |
| 4,794,294 | 12/1988 | Shimizu et al. . | |
| 4,833,358 | 5/1989 | Suzuki et al. . | |
| 5,021,700 | 6/1991 | Takahashi et al. | 310/316 |
| 5,477,099 | 12/1995 | Suganuma | 310/316 |
| 5,479,063 | 12/1995 | Suganuma | 310/316 |
| 5,563,464 | 10/1996 | Okubu et al. | 310/316 |
| 5,767,609 | 6/1998 | Suganuma | 310/316 |
| 5,886,483 | 3/1999 | Nogarede et al. . | |
| 5,920,144 | 7/1999 | Atsuta | 310/316 |

FOREIGN PATENT DOCUMENTS

| | | |
|---|---|---|
| 2 721 154 | 12/1995 | France . |
| 63-202278A | 8/1988 | Japan . |
| WO 91 08594 | 6/1991 | WIPO . |
| WO 95 34097A | 12/1995 | WIPO . |

OTHER PUBLICATIONS

French preliminary Search Report in SN 9802070—France.

*Primary Examiner*—Nicholas Ponomarenko
*Assistant Examiner*—Peter Medley
*Attorney, Agent, or Firm*—Bugnion S.A.; John Moetteli

[57] ABSTRACT

Supply circuit for a piezo-electric motor comprising a rotor driven, by friction, by a stator energized by at least two piezo-electric elements (P1, P2) supplied respectively with two alternating voltages (Vp, Va) of like amplitude and phase-shifted by approximately 90° by means of a single source and of a means intended for generating the two phase-shifted voltages. This means consists of a capacitor (C), in series with one of the piezo-electric elements (P2), whose value is chosen so that for a given frequency of the voltage of the source (S), substantially the same voltages and a phase-shift of 90° is obtained. The voltage of the source is advantageously controlled, in frequency, by a processing logic unit (PLU).

10 Claims, 3 Drawing Sheets

SUPPLY CIRCUIT FOR A TRAVELING-WAVE PIEZO-ELECTRIC MOTOR

BACKGROUND OF THE INVENTION

The subject of the present invention is a supply circuit for a traveling-wave piezo-electric motor comprising at least one rotor driven by friction, by at least one stator energized by at least two piezo-electric elements linked respectively, on the one hand, to the stator and, on the other hand, to two electrodes supplied respectively with two alternating voltages of like amplitude and phase-shifted by approximately 90° by means of a single alternating supply source and of a means intended for generating the two phase-shifted voltages.

Such a supply circuit is known from French patent 2 721 154, the content of which is incorporated by reference. In this document it is proposed, in order to remedy the drawbacks of the prior supply circuits comprising two supply sources created by independent supply devices, to supply the piezo-electric motor by means of a single high-frequency alternating source and of a means of adaptation connected, on the one hand, to the alternating source and, on the other hand, to the electrodes of the piezo-electric elements so as to generate the two voltages phase-shifted by around 90°. The means of adaptation consists of two quadripoles, one of these quadripoles comprising an inductance and a capacitance and the other quadripole an inductance. If the alternating supply source comprises a transformer whose primary and secondary stages both consist of two windings, the inductances of the quadripoles may be constituted by the transformer's own leakage inductances. It is however necessary to curb these leakages by interposing a gap in such a way as to increase the intrinsic leakage inductance, this requiring the manufacture of special transformers exhibiting greater radiation than standard transformers, and this may necessitate the provision of shielding for the whole of the circuit so as to comply with the normative constraints. Such a solution is therefore relatively heavy and expensive.

SUMMARY OF THE INVENTION

The present invention aims to produce a supply circuit which is as simple and lightweight as possible.

The supply circuit according to the invention is one wherein the means intended for generating the two phase-shifted voltages consists of a capacitor in series with one of said electrodes and whose value is chosen so that, for a given frequency of the voltage of the source, the amplitude of the voltage between the stator and the electrode of the piezo-electric element in series with the capacitor is substantially equal to the amplitude of the voltage of the source and that the phase shift of the currents in each piezo-electric element is about 90°.

The generation of two substantially equal voltages of amplitude phase-shifted by substantially 90° is therefore achieved simply by placing a capacitor in series with one or more of the pathways of the motors, that is to say without additional inductances.

The value of the capacitor must of course by adapted to the value of the impedance of the piezo-electric elements and to the frequency of the supply voltage. This value can inter alia be determined by the person skilled in the art such that the two phase-shifted voltages have substantially the same amplitude and that the currents in each pathway of the motor are substantially in phase quadrature.

The supply source can, for example, by controlled by a PLU (Processing Logic Unit), the presence of such a PLU making it possible moreover to determine the state of motion of the motor and subsequent change thereof, in particular its speed and its torque.

In a first phase of operation of the motor, the PLU can be used to control the frequency of operation of the motor. To this end, according to one embodiment, the voltage on the two phases of the motor, that is to say the voltage of the source and the voltage between the stator and the electrode of the piezo-electric element which is linked to the capacitor, are applied to the inputs of the PLU which is programmed in such a way as to adjust the frequency of the source in such a way that the amplitudes of said voltages are equal.

The supply source can also be frequency-controlled by applying to the inputs of the PLU the voltage of the source and the total current, the PLU being programmed in such a way as to adjust the frequency of the source in such a way that the voltage and the current are substantially in phase. The voltage of the source and the total current may be replaced respectively by the currents in each of the electrodes, the PLU being in this case programmed in such a way as to adjust the frequency in such a way that said currents are substantially in phase quadrature.

Instead of a PLU it is possible to use a phase-locked loop (PLL) acting so that the voltage of the source and the total current are substantially in phase.

BRIEF DESCRIPTION OF THE DRAWING(S)

The invention will be set forth in greater detail in relation to the appended drawing in which.

Figure 6:
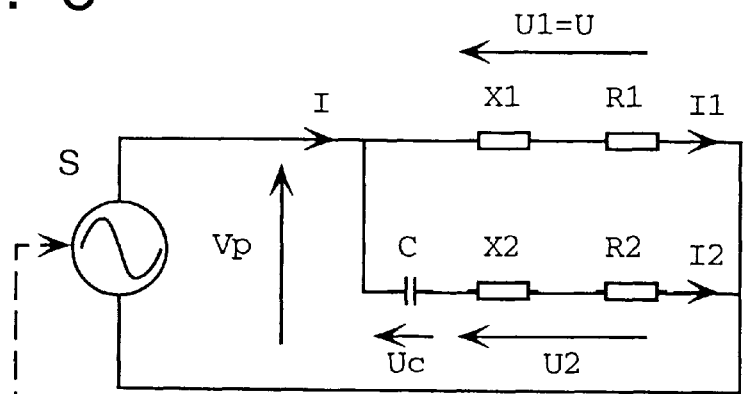
Figure 6:
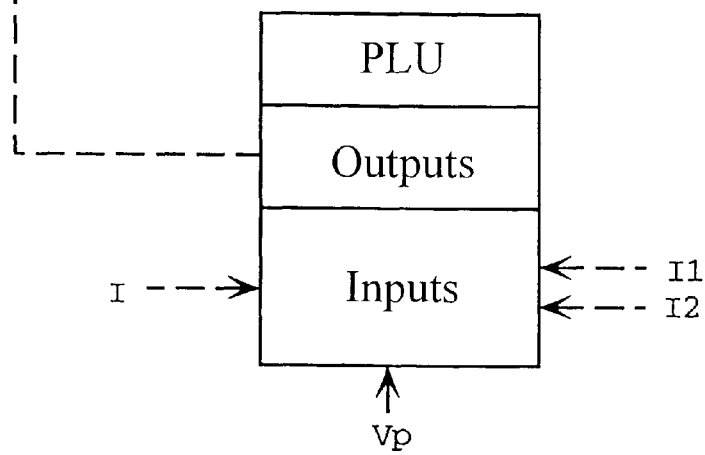
Figure 7:
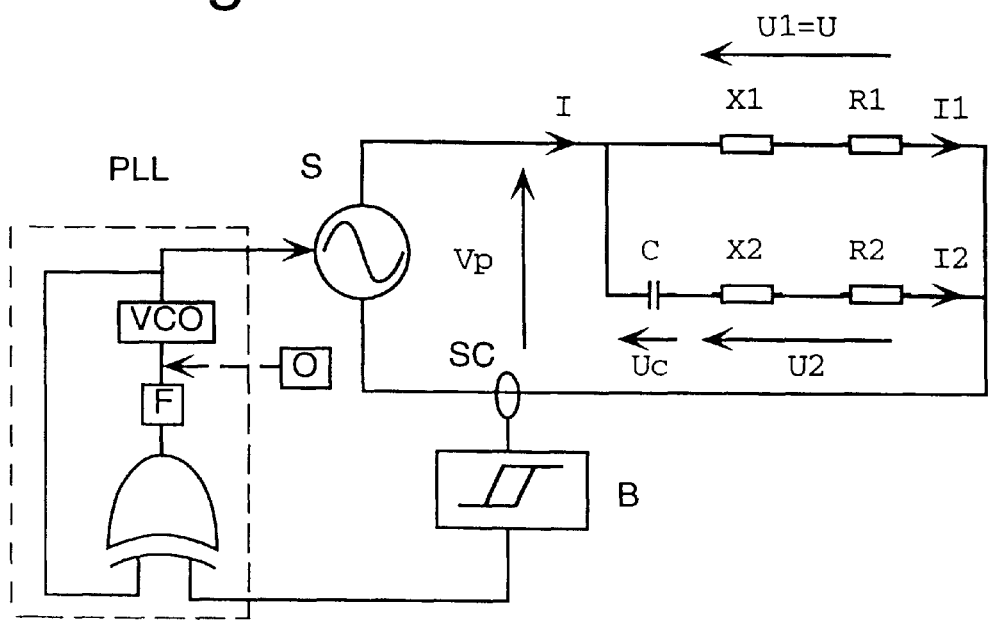

FIG. 6 again represents the equivalent diagram of the motor with the PLU for frequency control, but in the cases in which other operating parameters of the motor are applied to the inputs of the PLU; and FIG. 7 represents the motor controlled by a phase-locked loop.

DETAILED DESCRIPTION OF THE PREFERRED EMBODIMENT(S)

Figure 1:
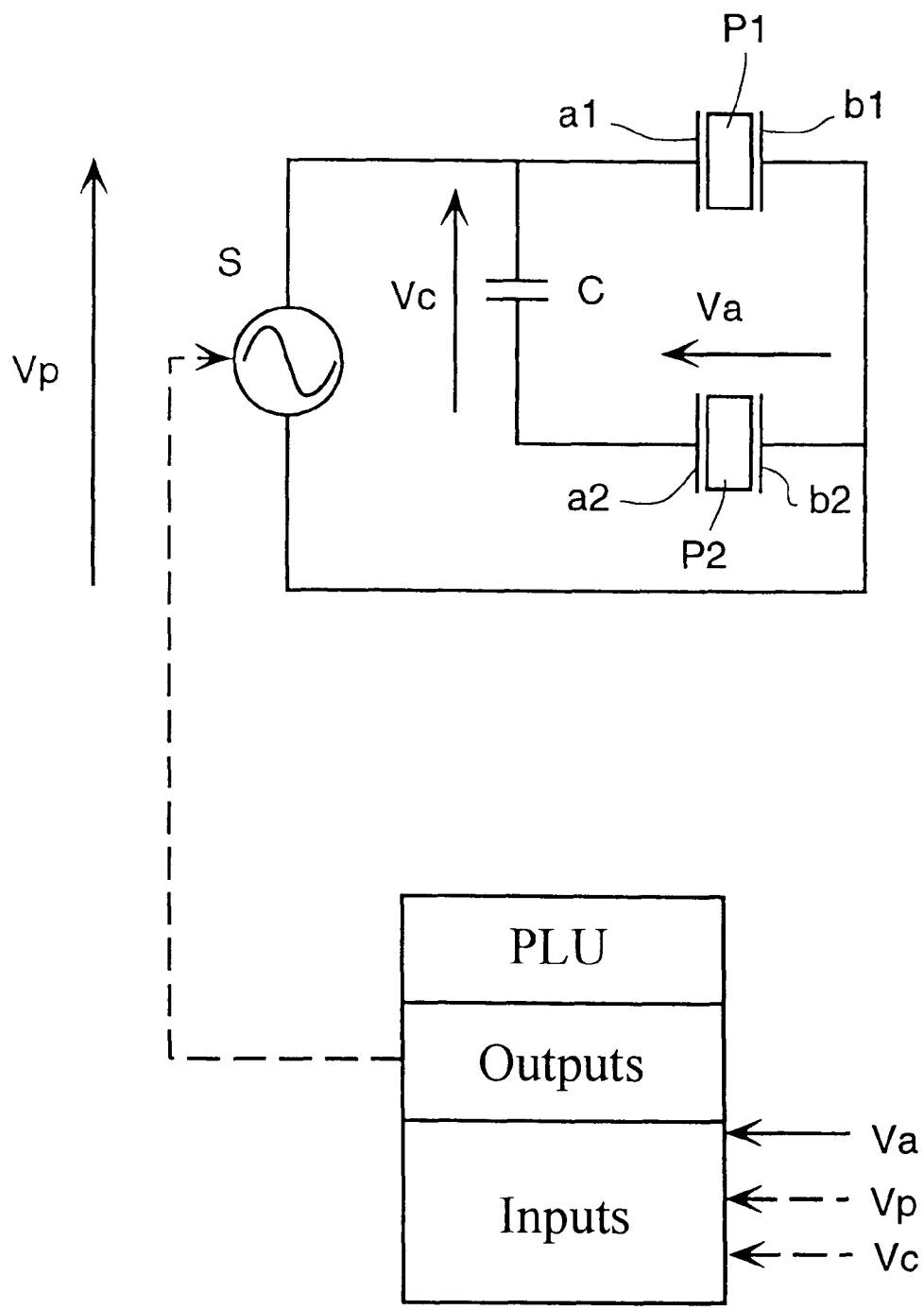
FIG. 1 represents the general diagram of a piezo-electric motor and of its supply circuit.

FIG. 1 represents the diagram of a piezo-electric motor comprising two piezo-electric elements P1 and P2 supplied by a source of alternating current S. In the diagram represented, each of the piezo-electric elements is fitted with two electrodes a1, b1, and a2, b2, respectively. In a piezo-electric motor such as described in patent application WO 91/08594, the content of which is incorporated by reference, the electrodes b1 and b2 in fact consist of the stator in which the piezo-electric elements are linked, the stator being linked to one of the terminals of the source S. For simplicity, only one pair of piezo-electric elements has been represented, but it is clear that this pair could be replaced by two sets each comprising several piezo-electric elements, as described in the abovementioned patent application. The electrode a1 of the piezo-electric element P1 is linked directly to the other terminal of the source S, whereas the electrode a2 of the other piezo-electric element P2 is linked to this terminal across a capacitor C.

Also represented in FIG. 1 is a PLU (Processing Logic Unit) whose role will be described later.

As will be set forth hereafter, the capacitor C makes it possible, on its own, to obtain two alternating voltages of like amplitude Vp and Va and two currents phase-shifted by around 90° on the two pathways consisting of the two piezo-electric elements P1 and P2.

This result will be explained with the aid of FIGS. 2 to 5.

Figure 2:
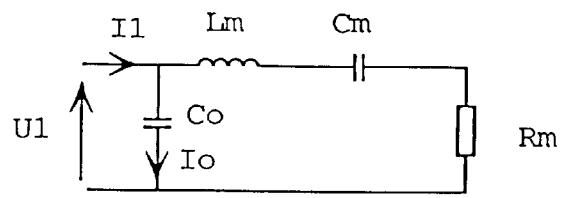
FIG. 2 represents the equivalent diagram of one phase of the motor without the additional capacitor.

The equivalent diagram of one supply phase or pathway of the piezo-electric motor according to FIG. 1, without the capacitor C, is represented, as a reminder, in FIG. 2. $L_m$, $C_m$, $R_m$ are respectively the inductance, the capacitance and the resistance of the "motional branch" which represent the piezo-electric effect and the electromechanical resonance for a frequency $f_o$ such that $$f_O = \frac{1}{2\pi\sqrt{L_m C_m}}$$

where $L_m$ represents the mass, $C_m$ the elasticity and $R_m$ the conversion into thermal land mechanical power, that is to say the loss and the useful power.

$C_o$ is the "blocked capacitance" of the pathway corresponding to the capacitance formed by the electrodes a1, b1 separated by a thickness of insulating material.

When the frequency f is slightly greater than $f_o$, the behavior of the motional branch is inductive overall and $U_1$ therefore leads $I_m$ by an angle $\psi_m$. There exists a frequency $f_T$ such that $\psi_m=45°$. This frequency is the working frequency for which $$R_m = L_m \omega_T - \frac{1}{C_m \omega_T}$$

For most configurations of piezo-electric motors $$\frac{1}{C_o \omega_T} \gg R_m$$

$\gg R_m$ and therefore $o \ll I_m$.

Figure 3:
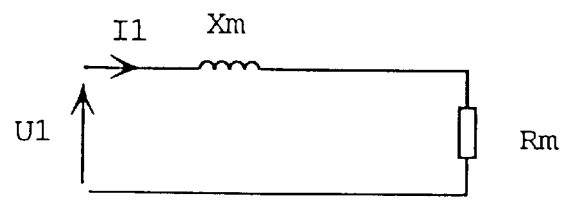
FIG. 3 represents the simplified equivalent diagram.

The capacitance $C_o$ therefore hardly comes into the equivalent diagram which can be simplified as represented in FIG. 3, where $$X_m = L_m \omega_T - \frac{1}{C_m \omega_T}$$

Figure 4:
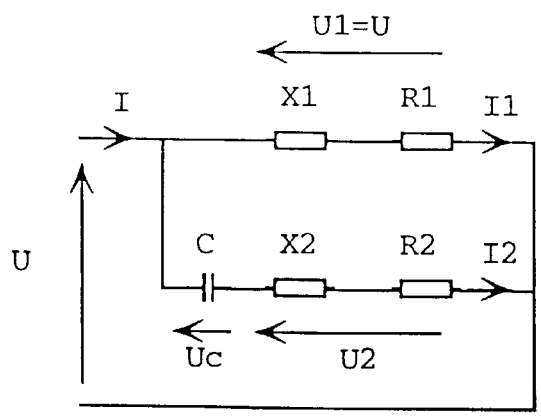
FIG. 4 represents the equivalent diagram of the motor represented in FIG. 1.

By applying this simplified equivalent diagram to the diagram of the motor represented in FIG. 1, the diagram represented in FIG. 4 is obtained in which $R_1 = R_2$ and $X_1 = X_2$.

It is desired, on the one hand, that the currents I1 and I2 be of like amplitude and 90° out of phase, and, on the other hand, that the total current I be in phase with the voltage U, so that it is not necessary to add elements for compensating for the reactive power.

Figure 5:
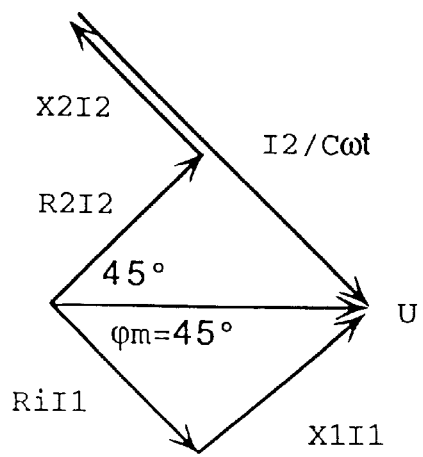
FIG. 5 represents the vector diagram corresponding to the diagram represented in FIG. 4.

These conditions correspond to the vector diagram represented in FIG. 5. They are satisfied if $$\frac{1}{C\omega_T} = 2X \quad \text{and} \quad R_{1,2} = X_{1,2}$$

For a specified value of $R_m$ the desired conditions are therefore fulfilled only for a specified working frequency. On the other hand, if the mechanical power varies, $R_m$ varies and the condition R=X is no longer satisfied. The diagram of FIG. 5 is altered: the currents $I_1$ and $I_2$ are no longer in quadrature and the voltages $U_1$ and $U_2$ are no longer equal.

It is henceforth possible, in this mode of supply, based on a single source and a capacitor:

a) for a given operating point, to search for the optimal working frequency $f_T$ such that the voltages $U_1$ and $U_2$ are equal in amplitude and therefore substantially 90° out of phase; and b) to monitor the deviations with respect to this operating point on the basis of the analysis of the variation of the amplitudes of $U_1$ and $U_2$ or of the variation of the phase-shift of the voltages and/or of the currents.

This is precisely the role of the PLU of FIG. 1.

In a first phase of operation the PLU is used to control the working frequency $f_T$ of the motor. To this end, according to a first embodiment, the voltages Vp and Va are applied to the inputs of the PLU which is programmed in such a way as to adjust the frequency of the source S in such a way that the amplitudes of the voltages Vp and Va are equal.

After this phase of adjustment, the frequency is no longer modified and the PLU can be used to determine the state of motion of the motor and to bring it to rest and reverse its direction of rotation.

The reversing of the direction of rotation is effected by reversing the voltages Va and Vp by means of a set of switches operated by the PLU.

Various procedures can be applied by the PLU.

The amplitude of the voltage Va can be compared with a reference value. If Va decreases, this signifies that the torque increases. The same is true if Vc is compared with a reference value.

According to other procedures, the PLU compares the voltages Va and Vp, either by calculating the phase-shift of these voltages, or the amplitude difference Vp−Va, or else the quotient of the amplitudes Vp/Va.

It is possible to ascertain the change in motion, over time, of one or other of these measurements or calculations by calculating its time derivative, this making it possible for the PLU to overcome natural drifting, mainly of the components and of the supply and thermal drifting of the motor.

As mentioned above, the frequency control of the supply source can also be effected by analysis of the variation in the phase-shift between voltage and current or between currents.

Represented again in FIG. 6 is the equivalent diagram of the motor according to FIG. 4 and a PLU for controlling the supply source S.

According to a second embodiment, the source voltage Vp and the total current I are applied to the inputs of the PLU and the PLU is programmed in such a way as to adjust the frequency of the sources S in such a way that the voltage Vp and the current I are substantially in phase. In the vector diagram of FIG. 5, this corresponds to the orientation of the vector U.

According to a third embodiment, also illustrated by FIG. 6, it is the current I1 in the piezo-electric element P1 and the current I2 in the piezo-electric element P2 which are applied to the inputs of the PLU, this PLU being programmed in such a way as to adjust the frequency of the source S in such a way that the currents I1 and I2 are substantially in phase quadrature as is the case in the vector diagram of FIG. 5.

A fourth embodiment is represented in FIG. 7, in which the motor is again represented by its equivalent diagram. In this embodiment, the PLU is replaced by a phase-locked loop PLL. The use of phase-locked loops to control the frequency of a piezo-electric motor has already been proposed. These applications are described in U.S. Pat. Nos. 4,794,294 and 4,833,358, the contents of which are incorporated by reference. In the phase-locked loop PLL an exclusive OR gate, a low-pass filter F and a voltage-controlled oscillator VCO may be seen. A signal is applied, one the other hand, to the exclusive OR gate, the signal being representative of the total current I obtained by means of a current probe SC and of a circuit B for filtering and shaping (Schmitt trigger), the current measured by the probe and, on the other hand, to a voltage corresponding to the voltage of the source Vp. The phase-locked loop acts so that the voltage Vp and the total current I are substantially in phase as in the second embodiment.

This latter embodiment has advantages over the previous embodiments. The electronics are simpler than that of a PLU, an integrated phase-locked loop circuit is commonplace and galvanic isolation is obtained between the motor and the electronics by virtue of the current probe and the secondary of the transformer of the supply source S in the case in which this source S is a chopped current supply.

This latter embodiment can be improved by adding an element for compensating for the erroneous phase-shift introduced by the filter and the circuit for shaping the current B.

In all the embodiments, it may be judicious to deliberately shift the frequency of the supply source with respect to the resonant frequency of the piezo-electric motor so as to improve the stability of this motor. This shift can be carried out by the PLU, respectively by the compensating element O in the case of the phase-locked loop.

What is claimed is:

1. A supply circuit for a traveling-wave piezo-electric motor comprising at least one rotor driven, by friction, by at least one stator energized by at least two piezo-electric elements linked respectively to the stator and to two electrodes supplied respectively with two alternating voltages (Vp, Va) of like amplitude and phase-shifted by approximately 90° by means of a single alternating supply source and of a means intended for generating the two phase-shifted voltages, wherein the means intended for generating the two phase-shifted voltages consists of a capacitor (C) in series with one of said electrodes and whose value is chosen so that, for a given frequency of the voltage of the source, the amplitude of the voltage between the stator and the electrode of the piezo-electric element in series with the capacitor is substantially equal to the amplitude of the voltage of the source and that the phase shift of the currents in each piezo-electric element is approximately 90°.

2. The supply circuit as claimed in claim 1, wherein, in a first phase of operation of the motor, the supply source is frequency-controlled by a PLU, the voltage of the source (Vp) and the voltage (Va) between the stator and that electrode of the piezo-electric element which is linked to the capacitor being applied to the inputs of the PLU and wherein the PLU is programmed in such a way as to adjust the frequency of the source so that the amplitudes of said voltages (Vp, Va) are equal.

3. The supply circuit as claimed in claim 1, wherein the supply source is controlled by a PLU, the voltage (Va) between the stator and the electrode of the piezo-electric element in series with the capacitor being applied to the inputs of the PLU.

4. The supply circuit as claimed in claim 3, wherein the voltage of the source and/or the voltage at the terminals of the capacitor is also applied to the inputs at the PLU.

5. The supply circuit as claimed in claim 4, wherein the PLU is programmed so as to compare the voltage between the stator and the electrode of the piezo-element in series with the capacitor with a reference value.

6. The supply circuit as claimed in claim 4, wherein the PLU is programmed so as to compare the voltage between the stator and the electrode of the piezo-electric element in series with the capacitor with the voltage of the source so as to calculate therefrom the phase shift, the amplitude difference, or the quotient of the amplitudes.

7. The supply circuit as claimed in claim 1, wherein the supply source (S) is frequency-controlled by a PLU, the source voltage (Vp) and the total current (I) being applied to the inputs of the PLU, the PLU being programmed in such a way as to adjust the frequency of the source (S) in such a way that the source voltage (Vp) and the total current (I) are substantially in phase.

8. The supply circuit as claimed in claim 1, wherein the supply source (S) is frequency-controlled by a PLU, the currents (I1, I2) in the two electrodes being applied to the inputs of the PLU, the PLU being programmed in such a way as to adjust the frequency of the source (S) so that the currents (I1, I2) are substantially in quadrature.

9. The supply circuit as claimed in claim 1, wherein the supply source (S) is frequency-controlled by a phase-locked loop (PLL) such that the source voltage (Vp) and the total current (I) are substantially in phase.

10. The supply circuit as claimed in one of claims 1 to 9, wherein it comprises an additional means (O; PLU) of deliberate shifting of the frequency which slightly shifts the frequency of the source in relation to the resonant frequency of the motor.

* * * * *

UNITED STATES PATENT AND TRADEMARK OFFICE
CERTIFICATE OF CORRECTION

PATENT NO. : 6,072,265
DATED : June 6, 2000
INVENTOR(S) : Grehant et al.

It is certified that error appears in the above-identified patent and that said Letters Patent are hereby corrected as shown below:

Col. 1, line 58, replace "by" by --be--;

Col. 2, line 57, replace "in which" by --to which--;

Col. 3, line 23, replace "land" by --and--;

Col. 3, line 48, replace ">>$R_m$ and therefore o<<$I_m$." by --and therefore $I_o$<<$I_m$--;

Col. 5 line 13 replace "one" by --on--;

Signed and Sealed this

Twenty-second Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,072,265
DATED : June 6, 2000
INVENTOR(S) : Grehant et al.

Page 1 of 1

It is certified that error appears in the above-identified patent and that said Letters Patent is hereby corrected as shown below:

Column 1,
Line 58, replace "by" by -- be --;

Column 2,
Line 57, replace "in which" by -- to which --;

Column 3,
Line 23, replace "land" by -- and --;

Line 48, replace ">>$R_m$ and therefore o<<$I_m$." by -- and therefore $I_o$<<$I_m$.--;

Column 5,
Line 13, replace "one" by -- on --;

Signed and Sealed this

Thirteenth Day of November, 2001

Attest:

NICHOLAS P. GODICI
*Attesting Officer*     *Acting Director of the United States Patent and Trademark Office*